(12) United States Patent
Wang

(10) Patent No.: US 7,050,248 B1
(45) Date of Patent: May 23, 2006

(54) METHOD AND APPARATUS FOR PATTERNING MAGNETIC MEDIA BY CONTACT PRINTING

(75) Inventor: Li-Ping Wang, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 73 days.

(21) Appl. No.: 10/429,800

(22) Filed: May 6, 2003

Related U.S. Application Data

(60) Provisional application No. 60/392,785, filed on Jun. 28, 2002.

(51) Int. Cl.
*G11B 5/86* (2006.01)

(52) U.S. Cl. .......................................... 360/16; 360/17
(58) Field of Classification Search ............. 360/15–17
See application file for complete search history.

(56) References Cited

U.S. PATENT DOCUMENTS

| | | | |
|---|---|---|---|
| 5,991,104 A | 11/1999 | Bonyhard | |
| 6,086,961 A | 7/2000 | Bonyhard | |
| 6,798,590 B1 * | 9/2004 | Albrecht et al. | 360/16 |
| 2002/0159177 A1 * | 10/2002 | Aoki et al. | 360/47 |
| 2003/0184896 A1 * | 10/2003 | Ishida et al. | 360/17 |

FOREIGN PATENT DOCUMENTS

EP 0915456 A1 * 12/1999

\* cited by examiner

*Primary Examiner*—David Hudspeth
*Assistant Examiner*—Varsha A. Kapadia
(74) *Attorney, Agent, or Firm*—McDermott Will & Emery LLP

(57) ABSTRACT

An apparatus for forming a magnetic transition pattern in a magnetic material by contact printing, comprising:

(a) a stamper having an imprinting surface comprising a plurality of projections and depressions arranged according to the magnetic transition pattern, the stamper being formed of at least one high saturation magnetization, high permeability magnetic material;

(b) means for supporting a workpiece such that a surface thereof comprised of the magnetic material is in contact with the imprinting surface;

(c) magnet means for applying a unidirectional re-alignment magnetic field to the stamper and workpiece to effect selective re-alignment of magnetic domains of portions of the magnetic material facing the depressions of the imprinting surface, such that the pattern of selectively re-aligned magnetic domains forms a pattern replicating the pattern of projections and depressions; and (d) means for applying sufficient pressure to the stamper and workpiece to overcome magnetic attraction between the stamper and the magnet means to thereby maintain full contact therebetween.

17 Claims, 2 Drawing Sheets

METHOD AND APPARATUS FOR PATTERNING MAGNETIC MEDIA BY CONTACT PRINTING

CROSS-REFERENCE TO PROVISIONAL APPLICATION

This application claims priority from U.S. provisional patent application Ser. No. 60/392,785 filed Jun. 28, 2002, the entire disclosure of which is incorporated herein by reference.

FIELD OF THE INVENTION

The present invention relates to methods and devices for forming magnetic transition patterns in a layer or body of magnetic material. The invention has particular utility in the formation of servo patterns in the surfaces of magnetic recording layers of magnetic data/information storage and retrieval media, e.g., hard disks.

BACKGROUND OF THE INVENTION

Magnetic recording media are widely used in various applications, e.g., in hard disk form, particularly in the computer industry for storage and retrieval of large amounts of data/information in magnetizable form. Such media are conventionally fabricated in thin film form and are generally classified as "longitudinal" or "perpendicular", depending upon the orientation (i.e., parallel or perpendicular) of the magnetic domains of the grains of the magnetic material constituting the active magnetic recording layer, relative to the surface of the layer.

A portion of a conventional thin-film, longitudinal-type recording medium 1 utilized in disk form in computer-related applications is schematically depicted in FIG. 1 and comprises a non-magnetic substrate 10, typically of glass or a metal, e.g., an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC"), and a lubricant topcoat layer 15, typically of a perfluoropolyether compound applied by dipping, spraying, etc.

In operation of medium 1, the magnetic layer 13 is locally magnetized by a write transducer or write head (not shown in FIG. 1 for simplicity) to record and store data/information. The write transducer creates a highly concentrated magnetic field which alternates direction based on the bits of information being stored. When the local magnetic field applied by the write transducer is greater than the coercivity of the recording medium layer 13, then the grains of the polycrystalline medium at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

A typical contact start/stop (CSS) method employed during use of disk-shaped media involves a floating transducer head gliding at a predetermined distance from the surface of the disk due to dynamic pressure effects caused by air flow generated between mutually sliding surfaces of the transducer head and the disk. During reading and recording (writing) operations, the transducer head is maintained at a controlled distance from the recording surface, supported on a bearing of air as the disk rotates, such that the transducer head is freely movable in both the circumferential and radial directions, thereby allowing data to be recorded and retrieved from the disk at a desired position in a data zone.

Adverting to FIG. 2, shown therein, in simplified, schematic plan view, is a magnetic recording disk 30 (of either longitudinal or perpendicular type) having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 2 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

As has been stated above, to record information on the disk, the transducer creates and applies a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

Commonly assigned U.S. Pat. No. 5,991,104 to Bonyhard, the entire disclosure of which is incorporated herein by reference, discloses a method for forming a servo pattern in a magnetic disk, comprising the steps of:

1) aligning a magnetic disk immediately adjacent a master servo-writer medium, the latter having a greater magnetic coercivity than the former, wherein the servo-writer medium has a master servo pattern magnetically stored thereon which defines a plurality of concentric tracks;

2) applying a magnetic assist field to the aligned master servo-writer medium and magnetic disk, the magnetic assist field having a substantially equal magnitude at all tracks on the aligned master servo-writer medium and magnetic disk; and 3) rotating the aligned master servo-writer medium and magnetic disk relative to the magnetic assist field.

However, the above-described method incurs several drawbacks associated with its implementation in an industrially viable manner. Specifically, a "one-of-a-kind" master writer with a very high write field gradient is necessary for writing the requisite high intensity, master magnetic servo pattern onto the master disk, and a complicated means for rotating the aligned master servo-writer disk and "slave" workpiece magnetic disk is required, as is a complex system for controlling/regulating/rotating the intensity (i.e., magnitude) and directions of the magnetic assist field.

Commonly assigned, co-pending U.S. patent application Ser. No. 10/082,178, filed Feb. 26, 2002, the entire disclosure of which is incorporated herein by reference, discloses an improvement over the invention disclosed in the aforementioned commonly assigned U.S. Pat. No. 5,991,104, and is based upon the discovery that very sharply defined magnetic transition patterns can be reliably, rapidly, and cost-effectively formed in a magnetic medium containing a longitudinal or perpendicular type magnetic recording layer: (1) without requiring expensive, complicated fabrication of a master disk (alternatively referred to as a "stamper/imprinter") having a contacting (i.e., imprinting) surface comprised of a plurality of magnets or magnetized areas corresponding to the desired magnetic transition pattern to be formed in the magnetic disk (i.e., "slave"), and (2) without requiring rotation of the master/slave pair in a magnetic assist field of variable strength and polarity.

Specifically, the invention disclosed in co-pending, commonly assigned U.S. patent application Ser. No. 10/082,178 is based upon recognition that a stamper/imprinter ("master") comprised of a magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, can be effectively utilized as a "master" contact mask (or "stamper/imprinter") for "imprinting" of a magnetic transition pattern, e.g., a servo pattern, in the surface of a magnetic recording layer of a magnetic medium ("slave"), whether of longitudinal or perpendicular type. A key feature of the invention is the use of a stamper/imprinter having an imprinting surface including a topographical pattern, i.e., comprised of projections and depressions, corresponding to a desired magnetic transition pattern, e.g., a servo pattern, to be formed in the magnetic recording layer. An advantage afforded by the invention is the ability to fabricate the topographically patterned imprinting surface of the stamper/imprinter, as well as the substrate or body therefor, of a single material, as by use of well-known and economical electro-forming techniques.

According to the disclosed invention, the magnetic domains of the magnetic recording layer of the slave medium are first unidirectionally aligned (i.e., "erased" or "initialized"), as by application of a first external, unidirectional magnetic field $H_{initial}$ of first direction and high strength greater than the saturation field of the magnetic recording layer, typically $\geq$2,000–10,000 Oe. The imprinting surface of the stamper/imprinter (master) is then brought into intimate (i.e., touching) contact with the surface of the magnetic recording layer (slave). With the assistance of a second externally applied magnetic field of second, opposite direction and lower but appropriate strength $H_{re-align}$, determined by $B_{sat}/\mu$ of the stamper material (typically $\geq$1000 Oe), the alignment of the magnetic domains at the areas of contact between the projections of the imprinting surface of the stamper/imprinter or at the areas facing the depressions of the imprinting surface of the stamper/imprinter and the magnetic recording layer of the medium to be patterned (slave) is selectively reversed, while the alignment of the magnetic domains at the non-contacting areas (defined by the depressions in the imprinting surface of the stamper/imprinter) or at the contacting areas, respectively, is unaffected, whereby a sharply defined magnetic transition pattern is created within the magnetic recording layer of the medium to be patterned (slave) which essentially mimics the topographical pattern of projections and depressions of the imprinting surface (master). According to the invention, high $B_{sat}$ and high $\mu$ materials are preferred for use as the stamper/imprinter in order to: (1) avoid early magnetic saturation of the stamper/imprinter at the contact points between the projections of the imprinting surface and the magnetic recording layer, and (2) provide an easy path for the magnetic flux lines which enter and/or exit at the side edges of the projections.

A stamper/imprinter for use in a typical application according to the disclosed invention, e.g., servo pattern formation in a disk-shaped, thin film, longitudinal or perpendicular magnetic recording medium, is formed according to conventional techniques, and comprises an imprinting surface having topographical features consisting of a pattern of well-defined projections and depressions corresponding to conventional servo patterns, as for example, disclosed in the aforementioned commonly assigned U.S. Pat. No. 5,991,104. For example, a suitable topography may comprise a plurality of projections having a height in the range from about 20 to about 500 nm, a width in the range from about 0.01 to about 1 μm, and a spacing of at least about 0.01 μm. Stampers/imprinters comprising imprinting surfaces with suitable surface topographies may be readily formed by a variety of techniques, such as electroforming onto a planar-surfaced substrate through an apertured, non-conductive mask, or by pattern formation in a planar-surfaced substrate by means photolithographic wet (i.e., chemical) or dry (e.g., plasma, sputter, or ion beam) etching techniques.

FIG. 3 illustrates a sequence of steps for performing magnetic transition patterning by contact printing of a longitudinal recording medium, e.g., medium 1 depicted in FIG. 1 and comprised of a non-magnetic substrate 10 and an overlying thin layer 13 of a longitudinal-type magnetic layer (where plating layer 11, polycrystalline underlayer 12, protective overcoat layer 14, and lubricant topcoat layer 15 are omitted from FIG. 3 in order not to unnecessarily obscure the essential features/aspects of the present invention) is initially subjected to a magnetic erase (or "initialization") process for unidirectionally aligning the longitudinally oriented magnetic domains $13_=$ of magnetic recording layer 13. Magnetic initialization of longitudinal medium 1 is accomplished by applying a first, high strength, unidirectional magnetic field $H_{initial}$ parallel to the surface of the magnetic recording layer, such that $H_{initial} \geq$ coercivity of layer 13' and is typically in the range from about 2,000 to about 10,000 Oe. In this instance, $H_{initial}$ is applied perpendicularly (i.e., normal) to the side edges of medium 1, whereas, by contrast, $H_{initial}$ for a perpendicular medium would be applied normal to the upper and lower major surfaces of the medium.

According to the next step of the process sequence, a stamper/imprinter 16 comprised of a body of magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, and having an imprinting surface 17 having a topography comprised of a plurality of projections 18 and depressions 19 arranged in a pattern corresponding to a magnetic transition pattern to be formed in the surface of magnetic recording layer 13, e.g., a servo pattern, is placed in intimate (i.e., touching) contact with the surface of layer 13. A suitable topography for the imprinting surface 17 of a contact mask-type stamper/imprinter 16 for use in forming a servo pattern in longitudinal recording layer 13 according to the invention may comprise a plurality of projections 18 having a height in the range from about 20 to about 500 nm, a width of at least about 0.01 μm, and a spacing (defining the depressions 19) in the range from about 0.01 to about 1 μm. A second, unidirectional magnetic re-alignment field $H_{re-align}$ parallel to the major surface of magnetic recording layer 13 but of lower strength and direction reverse that of the magnetic initialization field $H_{initial}$ is then applied normal to the side edge surfaces of stamper/imprinter 16, the strength of $H_{re-align}$ being optimized at a value determined by $B_{sat}/\mu$ of the stamper material (typically ≧100 Oe for the above-listed high $B_{sat}$, high μ materials). According to the invention, due to the high permeability μ of the stamper material, the magnetic flux $\phi$ provided by the re-alignment field $H_{re-align}$ enters and exits the side edges of the projections and tends to concentrate at the depressions 19 of the stamper/imprinter 16 (rather than at the projections 18). As a consequence, the non-contacted surface areas of magnetic recording layer 13 immediately beneath the depressions 19 experience a significantly higher magnetic field than the surface areas of the magnetic recording layer 13 in contact with the projections 18. If the re-alignment field strength $H_{re-align}$ is optimized, the direction of magnetization (i.e., alignment) of the longitudinally oriented magnetic domains $13_=$ of the magnetic recording layer 13 will be selectively reversed (as indicated by the arrows in the figure) at the areas facing the depressions 19 of the imprinting surface 17 of the stamper/imprinter 16, whereas the alignment of the longitudinally oriented magnetic domains $13_=$ of the magnetic recording layer 13 in contact with the projections 18 of the imprinting surface 17 of the stamper/imprinter 16 will be retained. Consequently, upon removal of the stamper/imprinter 16 and the re-alignment field $H_{re-align}$ in the next (i.e., final) step according to the inventive methodology, a longitudinal recording medium 1 is formed with a magnetic transition pattern comprising a plurality of reversely longitudinally oriented magnetic domains $13_{=R}$ corresponding to a desired servo pattern.

In practice, however, when the magnet, e.g., electromagnet, utilized as the source of the magnetic re-alignment field, is comprised of a C- or U-shaped yoke or pole piece, curved, i.e., arc-shaped, lines of magnetic flux exit and enter the facing ends of the yoke or pole piece for crossing the gap between the opposite polarity magnetic poles. As a consequence, the magnetic flux lines between the magnet poles are not parallel for their entire path and thus not perpendicular, i.e., normal, to the edge surface(s) of the stamper/imprinter, whereby an undesirable attractive force is exerted on the stamper/imprinter comprised of high permeability magnetic material, e.g., Ni, resulting in at least partial loss of intimate contact (i.e., separation) of the imprinting surface of the stamper/imprinter from the surface of the magnetic recording layer to be patterned, leading to poor or degraded pattern replication fidelity.

Accordingly, there exists a need for methodology and means for performing servo patterning by contact printing which is free of the above-described drawback or disadvantage arising from poor or uneven contact between the surfaces of the stamper/imprinter and magnetic recording layer of the media to be patterned. Moreover, there exists a need for methodology and instrumentalities for performing rapid, cost-effective servo patterning of thin film, high areal recording density magnetic recording media which do not engender the above-stated concerns associated with the conventional and contact printing methodologies for patterning of magnetic media.

The present invention addresses and solves the above-described problems, disadvantages, and drawbacks associated with prior methodologies for servo pattern formation in thin film magnetic recording media, while maintaining full compatibility with the requirements of automated magnetic hard disk manufacturing technology.

DISCLOSURE OF THE INVENTION

An advantage of the present invention is an improved method of forming a magnetic transition pattern in a magnetic material by contact printing.

Another advantage of the present invention is an improved method of forming a servo pattern in a magnetic recording medium.

Yet another advantage of the present invention is an improved apparatus for forming a magnetic transition pattern in a magnetic material by contact printing.

Still another advantage of the present invention is an improved apparatus for forming a servo pattern in a magnetic recording medium.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a method of forming a magnetic transition pattern in a magnetic material by contact printing, comprising steps of:
 (a) providing a workpiece including a surface comprised of the magnetic material, the magnetic material including a plurality of magnetic domains aligned in a first direction parallel to the surface;

(b) providing a stamper having an imprinting surface, the imprinting surface comprising a plurality of projections and depressions arranged in a pattern corresponding to the magnetic transition pattern to be formed in the magnetic material, the stamper being formed of at least one high saturation magnetization, high permeability magnetic material;

(c) placing the workpiece surface comprised of the magnetic material in contact with the imprinting surface of the stamper; and (d) applying a unidirectional re-alignment magnetic field from a magnet means to the stamper and the workpiece to effect selective re-alignment of the magnetic domains of those portions of the magnetic material which face the depressions of the imprinting surface of the stamper, such that the magnetic domains of the facing portions are selectively unidirectionally aligned in a second direction reverse that of the first direction, and the combination of aligned+re-aligned magnetic domains forms a pattern replicating the pattern of the projections and depressions, wherein:

step (d) further comprises applying sufficient pressure to the stamper and the workpiece to overcome magnetic attraction between the stamper and the magnet means to thereby maintain full contact between the imprinting surface and the workpiece surface.

According to embodiments of the present invention, step (d) comprises applying pressure to the stamper and the workpiece which is adjustable in relation to the strength of the magnetic attraction between the stamper and the magnet means.

In accordance with a preferred embodiment of the present invention, step (d) comprises utilizing an apparatus comprising a chamber containing the magnet means in an interior space thereof, the magnet means overlying a resiliently flexible end wall of the chamber adapted for (1) contacting a surface of the stamper opposite the imprinting surface and (2) applying a variable pressure to the stamper and the workpiece which is adjustable according to the pressure of a gas contained within the chamber.

According to further embodiments of the present invention, step (a) comprises providing a workpiece for a magnetic recording medium, the workpiece including a non-magnetic substrate having a surface with a layer of a magnetic recording material thereon; e.g., step (a) comprises providing a disk-shaped workpiece including a substrate comprised of a non-magnetic material selected from the group consisting of Al, NiP-plated Al, Al—Mg alloys, other Al-based alloys, other non-magnetic metals, other non-magnetic metal-based alloys, glass, ceramics, polymers, glass-ceramics, and composites and/or laminates thereof, and step (a) further comprises placing the workpiece in an initializing magnetic field having the first direction and a high strength sufficient to align each of the magnetic domains in the first direction.

In accordance with particular embodiments of the present invention, step (d) comprises applying a unidirectional re-alignment magnetic field having a second direction opposite the first direction of the unidirectional initializing magnetic field and a lower but sufficient strength to selectively reverse the alignment of the magnetic domains of the portions of the magnetic material which face the depressions of the imprinting surface of the stamper, while retaining the first direction alignment of the magnetic domains of the portions of the magnetic material in contact with the projections of the imprinting surface of the stamper.

According to embodiments of the present invention, step (b) comprises providing a stamper with an imprinting surface formed of at least one magnetic material having high saturation magnetization and high permeability, selected from the group consisting of Ni, NiFe, CoNiFe, CoSiFe, CoFe, and CoFeV; and step (b) may further comprise providing a stamper with an imprinting surface including a plurality of projections and depressions arranged in a pattern corresponding to a servo pattern for a magnetic data/information storage and retrieval medium.

Another aspect of the present invention is an apparatus for forming a magnetic transition pattern in a magnetic material by contact printing, comprising:

(a) a stamper having an imprinting surface, the imprinting surface comprising a plurality of projections and depressions arranged in a pattern corresponding to a magnetic transition pattern to be formed in the magnetic material, the stamper being formed of at least one high saturation magnetization, high permeability magnetic material;

(b) means for supporting a workpiece such that a surface thereof comprised of the magnetic material is in contact with the imprinting surface of the stamper;

(c) magnet means for applying a unidirectional re-alignment magnetic field to the stamper and the workpiece to effect selective re-alignment of magnetic domains of those portions of the magnetic material which face the depressions of the imprinting surface of the stamper, such that the pattern of selectively re-aligned magnetic domains forms a pattern replicating the pattern of the projections and depressions; and (d) means for applying sufficient pressure to the stamper and the workpiece to overcome magnetic attraction between the stamper and the magnet means to thereby maintain full contact between the imprinting surface and the workpiece surface.

According to embodiments of the present invention, means (d) for applying pressure comprises means for applying a variable amount of pressure to the stamper and the workpiece to maintain full contact therebetween.

In a preferred embodiment of the invention, magnet means (c) for applying a unidirectional re-alignment magnetic field is contained within an interior space of a chamber adjacent a resiliently flexible end wall of the chamber, the resiliently flexible end wall adapted for (1) contacting a surface of the stamper opposite the imprinting surface and (2) applying a variable pressure to the stamper and the workpiece which is adjustable according to the pressure of a gas contained within the interior space of the chamber; and means (d) for applying pressure comprises means for controllably regulating the pressure of the gas contained within the interior space of the chamber, wherein the means for controllably regulating the pressure of the gas contained within the interior space of the chamber comprises controllable valve means for controllably admitting and/or withdrawing a quantity of the gas from the chamber in response to a control signal.

According to embodiments of the present invention, magnet means (c) comprises a variable field intensity electromagnet; and according to particular embodiments, magnet means (c) includes a C- or U-shaped yoke or pole piece for supplying arc-shaped lines of magnetic flux which enter and exit major surfaces of the stamper and the workpiece in their path between opposite magnetic poles of the magnet; and according to further embodiments, magnet means (c) is rotatable about an axis perpendicular to the major surfaces of the stamper and the workpiece.

In accordance with embodiments of the present invention, stamper (a) comprises an imprinting surface formed of at least one magnetic material having high saturation magnetization and high permeability, selected from the group consisting of Ni, NiFe, CoNiFe, CoSiFe, CoFe, and CoFeV; and stamper (a) comprises an imprinting surface including a plurality of projections and depressions arranged in a pattern corresponding to a servo pattern for a magnetic data/information storage and retrieval medium.

Yet another aspect of the present invention is an apparatus for forming a magnetic transition pattern in a workpiece comprising a magnetic material, comprising:

(a) a stamper having a patterned imprinting surface corresponding to a magnetic transition pattern to be formed in the magnetic material; and (b) means for applying sufficient pressure to the stamper and the workpiece to overcome magnetic attraction between the stamper and a magnet of the apparatus utilized for forming the magnetic transition pattern.

According to preferred embodiments of the present invention, stamper (a) comprises an imprinting surface including a plurality of projections and depressions arranged in a pattern corresponding to a servo pattern for a magnetic data/information storage and retrieval medium.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention addresses and solves problems and difficulties attendant upon the use of stampers/imprinters in contact printing processing for creating magnetic transition patterns, for example servo patterns, in a magnetic material, e.g., a thin film of a magnetic material forming the active recording layer of a magnetic recording medium. The invention is an improvement over that disclosed in the aforementioned commonly assigned, co-pending U.S. patent application Ser. No. 10/082, 178, filed Feb. 26, 2002, and is based upon the discovery that a sufficient pressure must be applied to the stamper/imprinter when in contact with the magnetic material to be patterned in the presence of the magnetic re-alignment field in order to overcome magnetic attraction between the stamper/imprinter and the source of the magnetic re-alignment field, thereby maintaining contact between the imprinting surface of the stamper/imprinter and the magnetic material over the entire extent of mutual contact. As a consequence, of the inventive methodology, very sharply defined magnetic transition patterns can be reliably, rapidly, and cost-effectively formed in a magnetic material, e.g., a longitudinal magnetic recording layer, in instances when the magnetic flux lines of the re-alignment field are not ideally shaped or oriented (as when they are curved rather than linear, as in FIG. 3, and therefore enter and exit the stamper/imprinter via the rear surface rather than the side edge surfaces).

Specifically, the present invention is based upon recognition that good contact between a stamper/imprinter composed of a magnetic material having a high saturation magnetization $B_{sat} \gtrsim$ about 0.5 Tesla, and a high permeability, $\mu \gtrsim$ about 5 (e.g., of Ni, NiFe, CoNiFe, CoSiFe, CoFe, or CoFeV), and a surface of a longitudinal magnetic recording layer, when the former is utilized as a contact mask for "printing" of a magnetic transition pattern, e.g., a servo pattern, in the surface of the latter is difficult to maintain during the contact printing process, due to magnetic attraction between the stamper/imprinter and the magnetic re-alignment source arising from use of a magnetic source providing non-ideally shaped magnetic flux lines. A key feature, therefore, of the present invention, is provision of an apparatus for performing magnetic transition patterning of a magnetic material which comprises a means for applying a sufficient pressure to the stamper/imprinter and the magnetic recording layer to overcome any magnetic attraction between the stamper/imprinter and the magnetic re-alignment source arising from use of magnetic re-alignment sources providing non-ideally shaped magnetic flux lines, and thus maintain good contact between the imprinting surface and the magnetic recording layer.

Figure 1:
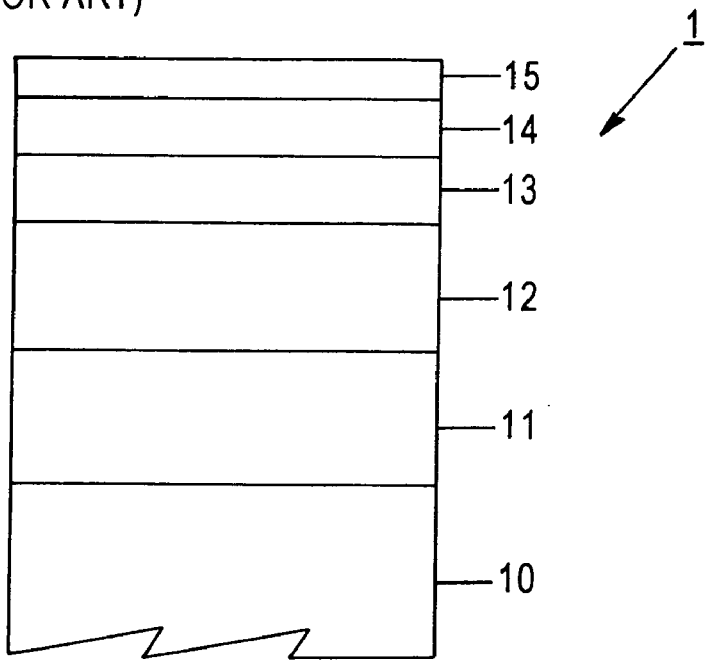
FIG. 1 illustrates, in schematic, simplified cross-sectional view, a portion of a longitudinal-type thin film magnetic recording medium.
Figure 2:
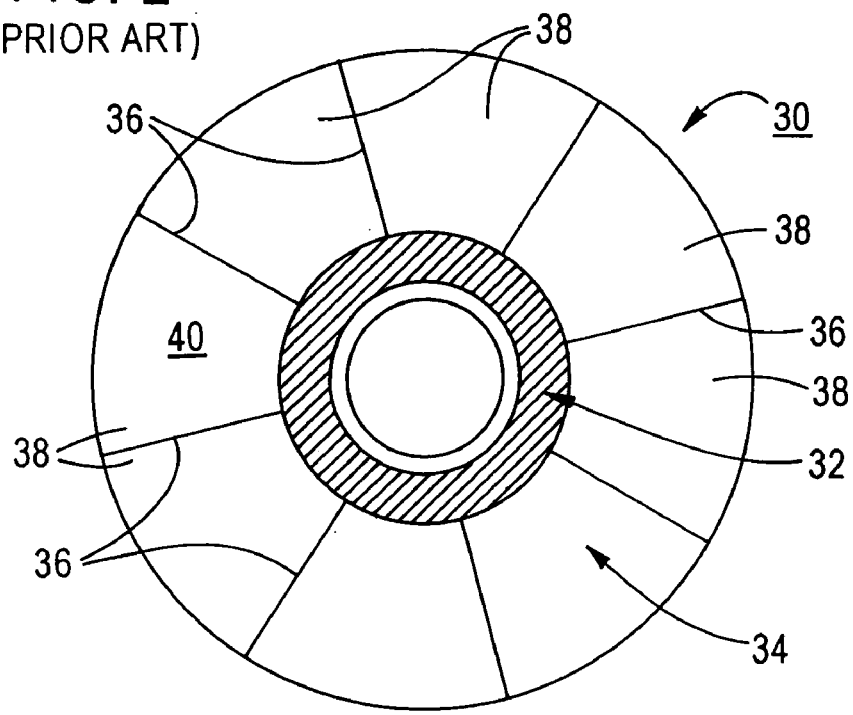
FIG. 2 is a simplified, schematic plan view, of a magnetic recording disk for illustrating the data, servo pattern, and CSS zones thereof.
Figure 3:
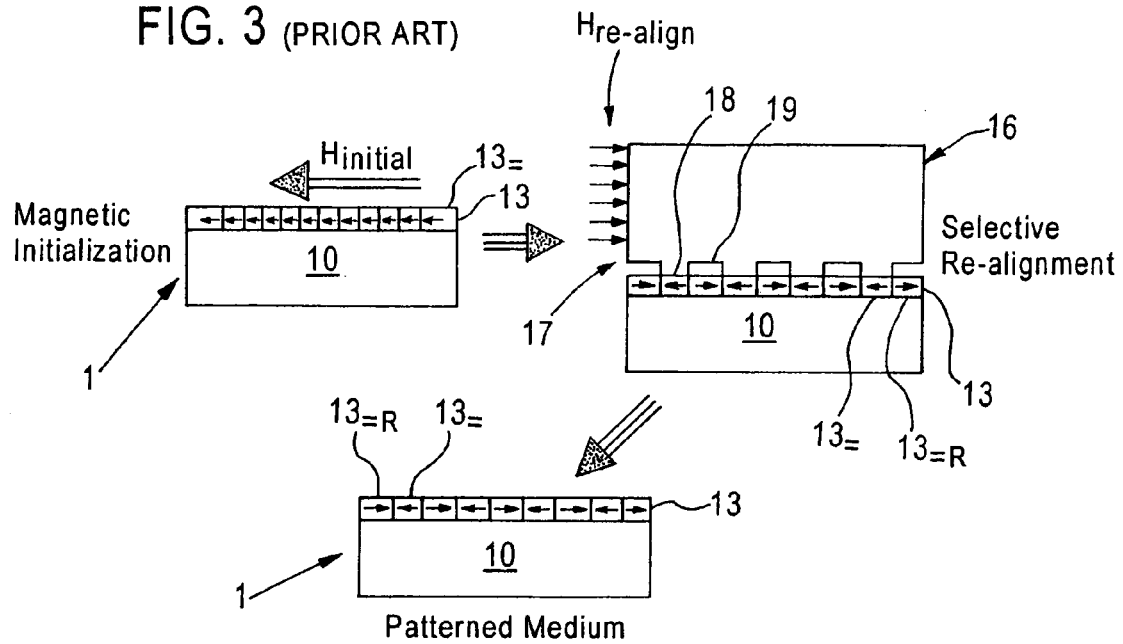
FIG. 3 illustrates, in schematic, simplified cross-sectional view, a sequence of process steps performed according to the invention for creating a magnetic transition pattern in the surface of a longitudinal magnetic recording layer.
Figure 4:
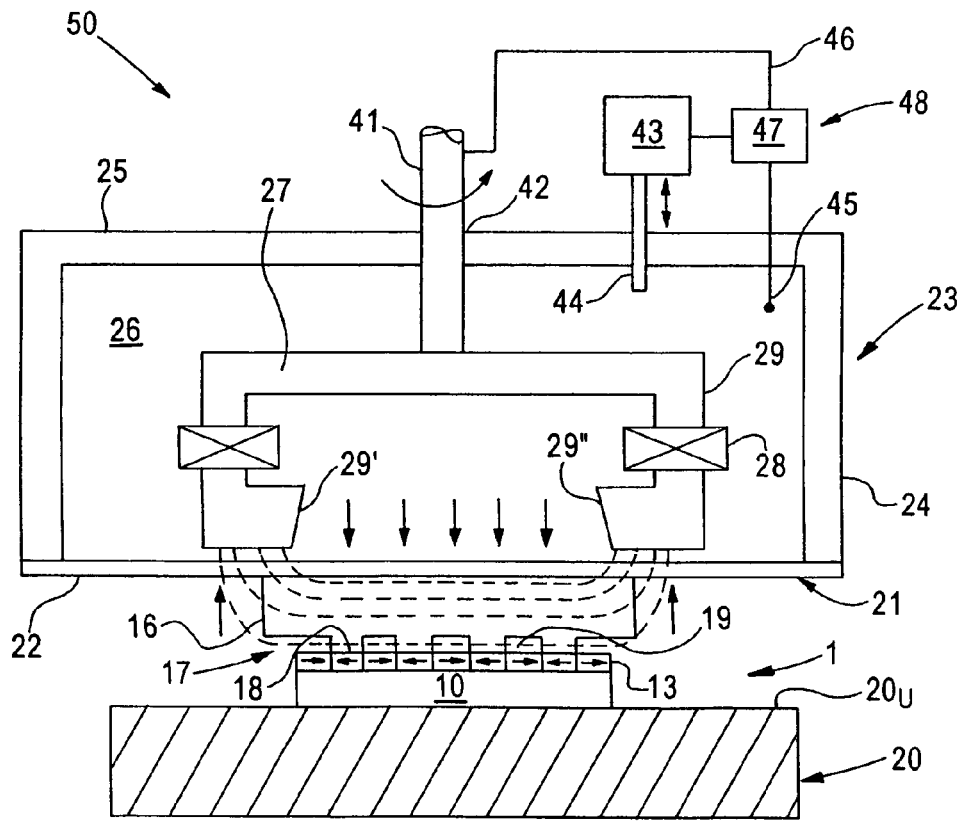
FIG. 4 shows, in schematic, simplified cross-sectional view, an illustrative, but non-limitative, embodiment of a contact printing apparatus according to the invention.

Referring to FIG. 4, shown therein, in schematic, simplified cross-sectional view, is an illustrative, but non-limitative, embodiment of a contact printing apparatus 50 according to the invention, adapted for applying a variable pressure to a stamper/imprinter 16 comprised of a body of magnetizable material with a high saturation magnetization $B_{sat} \gtrsim$ about 0.5 Tesla, and a high permeability, $\mu \gtrsim$ about 5 (e.g., of Ni, NiFe, CoNiFe, CoSiFe, CoFe, or CoFeV), the stamper/imprinter 16 having an imprinting surface 17 including a plurality of projections 18 (with intervening depressions 19) in contact with the upper surface of a magnetic recording medium 1 similar to that shown in FIG. 3 comprised of a longitudinal magnetic recording layer 13 overlying a non-magnetic substrate 10, which longitudinal magnetic recording layer includes a plurality of longitudinally oriented magnetic domains $13_=$.

According to the invention, the stacked stamper/imprinter 16 and medium 1, with the imprinting surface 17 of the stamper/imprinter 16 in contact with the surface of recording layer 13 of medium 1, are sandwiched between a substantially rigid base plate 20 of a non-magnetic material, e.g., a metal, with a planar upper surface $20_U$ for supporting substrate 10 thereon, and a resiliently flexible membrane 21 of, for example, a silicone-based rubber or other resiliently flexible polymeric material (e.g., PTFE), for contacting the rear (upper) surface of the stamper/imprinter 16. Resiliently flexible membrane 21 forms a bottom wall 22 of a generally cylindrically-shaped chamber 23 defined by substantially rigid side and top walls 24 and 25, respectively. The interior space 26 of chamber 23 is provided with a magnet assembly 27, illustratively an electromagnet assembly including coil 28 and a generally C-shaped yoke 29 with opposing ends 29' and 29" forming spaced-apart magnetic poles of opposite polarity. Magnet assembly 27 is further adapted for rotation (by means not shown in the figure for illustrative simplicity) about an axis coincident with the central axis of chamber 23, via vertically extending shaft 41 passing through a bearing-equipped opening 42 in the upper wall 25 thereof.

Apparatus 50 further comprises chamber pressure control means 48 comprising gas supply/withdrawal means 43 fluidly connected to the interior space 26 of chamber 23 via conduit 44 extending through an opening in a chamber wall, illustratively upper wall 25. Gas supply/withdrawal means 43 is controllably activated, as by pressure sensor means 45 and electromagnet power (i.e., current) sensing line 46 connected to controller 47, for supplying or withdrawing gas from the interior space 26 in order to maintain a desired pressure within the interior space 26 for controllably urging resiliently flexible membrane 21 against the rear surface of stamper/imprinter 16 for maintaining the imprinting surface 17 thereof in intimate contact with the upper surface of magnetic recording layer 13 during the magnetic re-alignment phase of the contact printing process.

In a typical contact printing operation according to the invention utilizing apparatus 50, a longitudinal magnetic recording medium 1 comprised of a non-magnetic substrate 10 and a longitudinal magnetic recording layer 13 is first subjected, as described in reference to FIG. 3, to a magnetic erase or "initialization" process for unidirectionally aligning the longitudinally oriented domains $13_=$ of magnetic recording layer 13. Magnetic initialization of longitudinal medium 1 is accomplished by applying a first, high strength, unidirectional magnetic field $H_{initial}$ substantially parallel to the surface of the magnetic recording layer, such that $H_{initial} \geqq$ coercivity of layer 13' and is typically in the range from about 2,000 to about 10,000 Oe.

According to the next step of the process sequence, a stamper/imprinter 16 comprised of a body of magnetic material having a high saturation magnetization $B_{sat} \geqq$ about 0.5 Tesla, and a high permeability $\mu \geqq$ about 5, e.g., selected from Ni, NiFe, CoNiFe, CoSiFe, CoFe, and CoFeV, and including an imprinting surface 17 having a topography comprised of a plurality of projections 18 and depressions 19 arranged in a pattern corresponding to a magnetic transition pattern to be formed in the surface of magnetic recording layer 13, e.g., a servo pattern, is positioned such that its rear, or upper, surface is in contact with the lower surface of the resiliently flexible membrane 21 forming the chamber lower wall 22 and the non-magnetic substrate 10 of medium 1 is supported on base plate 20 of apparatus 50 such that the imprinting surface 17 of the stamper/imprinter is in intimate (i.e., touching) contact with the surface of magnetic recording layer 13.

A suitable topography for the imprinting surface 17 of a contact mask-type stamper/imprinter 16 for use in forming a servo pattern in longitudinal recording layer 13 according to the invention may comprise a plurality of projections 18 having a height in the range from about 20 to about 500 nm, a width of at least about 0.01 µm, and a spacing (defining the depressions 19) in the range from about 0.01 to about 1 µm.

A second, unidirectional magnetic re-alignment field $H_{re-align}$ substantially parallel to the major surface of magnetic recording layer 13 and of lower strength and direction reverse that of the magnetic initialization field $H_{initial}$ is then applied to stamper/imprinter 16, the strength of $H_{re-align}$ being optimized at a value determined by $B_{sat}/\mu$ of the stamper material (typically $\geqq 100$ Oe for the above-listed high $B_{sat}$, high µ materials). According to the invention, due to the high permeability µ of the stamper material, the magnetic flux φ provided by the re-alignment field $H_{re-align}$ (shown by the dashed lines in FIG. 4) enters and exits the side edges of the projections and tends to concentrate at the depressions 19 of the stamper/imprinter 16 (rather than at the projections 18). As a consequence, the non-contacted surface areas of magnetic recording layer 13 immediately beneath the projections 18 experience a significantly higher magnetic field than the surface areas of the magnetic recording layer 13 in contact with the projections 18. If the re-alignment field strength $H_{re-align}$ is optimized, the direction of magnetization (i.e., alignment) of the longitudinally oriented magnetic domains $13_=$ of the magnetic recording layer 13 will be selectively reversed (as shown in FIG. 3) at the areas facing the depressions 19 of the imprinting surface 17 of the stamper/imprinter 16, whereas the alignment of the longitudinally oriented magnetic domains $13_=$ of the magnetic recording layer 13 in contact with the projections 18 of the imprinting surface 17 of the stamper/imprinter 16 will be retained. Consequently, upon removal of the stamper/imprinter 16 and the re-alignment field $H_{re-align}$ in a subsequent step according to the inventive methodology, a longitudinal recording medium 1 is formed with a magnetic transition pattern comprising a plurality of reversely longitudinally oriented magnetic domains $13_{=R}$ corresponding to a desired servo pattern.

However, the curved lines of magnetic flux φ provided by the re-alignment field $H_{re-align}$ (shown in the figure by dashed lines) which enter and exit the stamper/imprinter 16 at angles other than normal to the side edges thereof disadvantageously result in generation of an attractive force between the stamper/imprinter 16 and the magnet assembly 27, as indicated by the upwardly oriented arrows in the figure adjacent the side edges of the stamper/imprinter, tending to result in separation, i.e., loss of intimate contact, of the imprinting surface 17 of stamper/imprinter 16 and the magnetic recording layer 13, leading to poor pattern replication fidelity. According to the invention, however, apparatus 50 is provided with means 48 for controllably varying and/or maintaining the gas pressure within the interior space 26 of chamber 23 for applying a downwardly extending force to the resiliently flexible membrane 21, as indicated by the downwardly oriented arrows in the figure, which force is controllably varied by controller 47 and gas supply/withdrawal means 43 based upon signals inputted from gas pressure sensor 45 and electromagnet current sensing line 46. As a consequence, according to the invention, sufficient downward force is applied to the stamper/imprinter 16 during the magnetic re-alignment processing to compensate for (i.e., overcome) the upward, attractive force and thereby maintain intimate contact between the imprinting and recording layer surfaces throughout the contact printing process, advantageously leading to high fidelity pattern replication.

While in the illustrated embodiment, single-sided contact printing is performed, the inventive methodology/apparatus is not so limited, and stamper/imprinters with dual imprinting surfaces may be equally well utilized for simultaneously contact printing a pair of magnetic recording media. Alternatively, a pair of stamper/imprinters may be utilized according to the invention for simultaneously contact printing both sides of dual-sided recording media.

In the previous description, numerous specific details are set forth, such as specific materials, structures, processes, etc., in order to provide a better understanding of the present invention. However, the present invention can be practiced without resorting to the details specifically set forth. In other instances, well-known processes, materials, and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of forming a magnetic transition pattern in a magnetic material by contact printing, comprising steps of:
   (a) providing a workpiece including a surface comprised of said magnetic material, said magnetic material including a plurality of magnetic domains aligned in a first direction parallel to said surface;
   (b) providing a stamper having an imprinting surface, said imprinting surface comprising a plurality of projections and depressions arranged in a pattern corresponding to said magnetic transition pattern to be formed in said magnetic material, said stamper being formed of at least one high saturation magnetization, high permeability magnetic material;
   (c) placing said workpiece surface comprised of said magnetic material in contact with said imprinting surface of said stamper; and
   (d) applying a unidirectional re-alignment magnetic field from a magnet means to said stamper and said workpiece to effect selective re-alignment of the magnetic domains of those portions of said magnetic material which face said depressions of said imprinting surface of said stamper, such that said magnetic domains of said facing portions are selectively unidirectionally aligned in a second direction reverse that of said first direction, and the combination of aligned+re-aligned magnetic domains forms a pattern replicating said pattern of said projections and depressions, wherein:
   step (d) further comprises applying sufficient pressure to said stamper and said workpiece to overcome magnetic attraction between said stamper and said magnet means to thereby maintain full contact between said imprinting surface and said workpiece surface, and said pressure applied to said stamper and said workpiece is adjustable in relation to the strength of said magnetic attraction between said stamper and said magnet means.

2. The method according to claim 1, wherein:
   step (d) comprises utilizing an apparatus comprising a chamber containing a said magnet means in an interior space thereof, said magnet means overlying a resiliently flexible end wall of said chamber adapted for (1) contacting a surface of said stamper opposite said imprinting surface and (2) applying a variable pressure to said stamper and said workpiece which is adjustable according to the pressure of a gas contained within said chamber.

3. The method according to claim 1, wherein:
   step (a) comprises providing a workpiece for a magnetic recording medium, said workpiece including a non-magnetic substrate having a surface with a layer of a magnetic recording material thereon.

4. The method according to claim 3, wherein:
   step (a) comprises providing a disk-shaped workpiece including a substrate comprised of a non-magnetic material selected from the group consisting of Al, NiP-plated Al, Al—Mg alloys, other Al-based alloys, other non-magnetic metals, other non-magnetic metal-based alloys, glass, ceramics, polymers, glass-ceramics, and composites and/or laminates thereof.

5. The method according to claim 1, wherein:
   step (a) further comprises placing said workpiece in an initializing magnetic field having said first direction and a high strength sufficient to align each of said magnetic domains in said first direction.

6. The method according to claim 5, wherein:
   step (d) comprises applying a said unidirectional re-alignment magnetic field having a second direction opposite said first direction of said unidirectional initializing magnetic field and a lower but sufficient strength to selectively reverse the alignment of said magnetic domains of said portions of said magnetic material which face said depressions of said imprinting surface of said stamper, while retaining the first direction alignment of said magnetic domains of the portions of said magnetic material in contact with said projections of said imprinting surface of said stamper.

7. The method according to claim 1, wherein:
   step (b) comprises providing a said stamper with a said imprinting surface formed of at least one magnetic material having high saturation magnetization and high permeability, selected from the group consisting of Ni, NiFe, CoNiFe, CoSiFe, CoFe, and CoFeV.

8. The method according to claim 1, wherein:
   step (b) comprises providing a said stamper with a said imprinting surface including a plurality of projections and depressions arranged in a pattern corresponding to a servo pattern for a magnetic data/information storage and retrieval medium.

9. An apparatus for forming a magnetic transition pattern in a magnetic material by contact printing, comprising:
   (a) a stamper having an imprinting surface, said imprinting surface comprising a plurality of projections and depressions arranged in a pattern corresponding to said magnetic transition pattern to be formed in said magnetic material, said stamper being formed of at least one high saturation magnetization, high permeability magnetic material;
   (b) means for supporting a workpiece such that a surface thereof comprised of said magnetic material is in contact with said imprinting surface of said stamper;
   (c) magnet means for applying a unidirectional re-alignment magnetic field to said stamper and said workpiece to effect selective re-alignment of magnetic domains of those portions of said magnetic material which face said depressions of said imprinting surface of said stamper, such that the pattern of selectively re-aligned magnetic domains forms a pattern replicating said pattern of said projections and depressions; and
   (d) means for applying sufficient pressure to said stamper and said workpiece to overcome magnetic attraction between said stamper and said magnet means to thereby maintain full contact between said imprinting surface and said workpiece surface, wherein said means for applying sufficient pressure to said stamper comprises a chamber with a resiliently flexible end wall, said resiliently flexible end wall adapted for (1) contacting a surface of said stamper opposite said imprinting surface and (2) applying a variable pressure to said stamper and said workpiece which is adjustable according to the pressure of a gas contained within said interior space of said chamber.

10. The apparatus as in claim 9, wherein:
means (d) for applying pressure comprises means for applying a variable amount of pressure to said stamper and said workpiece to maintain full contact therebetween.

11. The apparatus as in claim 10, wherein:
magnet means (c) for applying a unidirectional re-alignment magnetic field is contained within an interior space of the chamber adjacent the resiliently flexible end wall of said chamber, and
means (d) for applying pressure comprises means for controllably regulating the pressure of said gas contained within said interior space of said chamber.

12. The apparatus as in claim 11, wherein:
said means for controllably regulating the pressure of said gas contained within said interior space of said chamber comprises controllable valve means for controllably admitting and/or withdrawing a quantity of said gas from said chamber in response to a control signal.

13. The apparatus as in claim 9, wherein:
magnet means (c) comprises a variable field intensity electromagnet.

14. The apparatus as in claim 9, wherein:
magnet means (c) includes a C- or U-shaped yoke or pole piece for supplying arc-shaped lines of magnetic flux which enter and exit major surfaces of said stamper and said workpiece in their path between opposite magnetic poles of said magnet.

15. The apparatus as in claim 14, wherein:
magnet means (c) is rotatable about an axis perpendicular to said major surfaces of said stamper and said workpiece.

16. The apparatus as in claim 9, wherein:
stamper (a) comprises an imprinting surface formed of at least one magnetic material having high saturation magnetization and high permeability, selected from the group consisting of Ni, NiFe, CoNiFe, CoSiFe, CoFe, and CoFeV.

17. The apparatus as in claim 9, wherein:
stamper (a) comprises an imprinting surface including a plurality of projections and depressions arranged in a pattern corresponding to a servo pattern for a magnetic data/information storage and retrieval medium.

* * * * *